United States Patent
Meiyappan

(10) Patent No.: US 8,005,479 B2
(45) Date of Patent: *Aug. 23, 2011

(54) METHOD AND APPARATUS FOR ADAPTIVE CARRIER ALLOCATION AND POWER CONTROL IN MULTI-CARRIER COMMUNICATION SYSTEMS

(75) Inventor: Palaniappan Meiyappan, Bellevue, WA (US)

(73) Assignee: Adaptix, Inc., Carrollton, TX (US)

( * ) Notice: Subject to any disclaimer, the term of this patent is extended or adjusted under 35 U.S.C. 154(b) by 970 days.

This patent is subject to a terminal disclaimer.

(21) Appl. No.: 10/534,200

(22) PCT Filed: Nov. 7, 2002

(86) PCT No.: PCT/US02/36030
§ 371 (c)(1),
(2), (4) Date: Jan. 18, 2006

(87) PCT Pub. No.: WO2004/045228
PCT Pub. Date: May 27, 2004

(65) Prior Publication Data
US 2006/0154684 A1    Jul. 13, 2006

(51) Int. Cl.
*H04W 72/00* (2009.01)
(52) U.S. Cl. .......... 455/450; 455/509; 455/522; 455/69; 455/513; 455/115.3; 370/311; 370/318; 370/329; 370/328; 370/348
(58) Field of Classification Search .................. 455/450, 455/509, 451, 452.1, 452.2, 454, 464, 522, 455/69, 513, 115.3; 370/329, 328, 348, 443, 370/431, 311, 318
See application file for complete search history.

(56) References Cited

U.S. PATENT DOCUMENTS

| | | | |
|---|---|---|---|
| 5,479,447 A | | 12/1995 | Chow et al. |
| 5,491,837 A | * | 2/1996 | Haartsen .......................... 455/62 |
| 5,504,775 A | | 4/1996 | Chouly et al. |
| 5,515,378 A | | 5/1996 | Roy, III et al. |
| 5,726,978 A | * | 3/1998 | Frodigh et al. ................ 370/252 |
| 5,734,967 A | | 3/1998 | Kotzin et al. |
| 5,887,245 A | * | 3/1999 | Lindroth et al. ................ 455/69 |
| 6,061,568 A | | 5/2000 | Dent |

(Continued)

FOREIGN PATENT DOCUMENTS

DE      198 00 953      7/1999

(Continued)

OTHER PUBLICATIONS

Farsakh, C., et al., "Maximizing the SDMA Mobile Radio Capacity Increase by DOA Sensitive Channel Allocation", Wireless Personal Communications, Kluwer Academic Publishers, NL, vol. 11, No. 1, Oct. 1999, pp. 63-76.

(Continued)

*Primary Examiner* — Kamran Afshar
*Assistant Examiner* — Sayed T Zewari
(74) *Attorney, Agent, or Firm* — Fulbright & Jaworski L.L.P.

(57) ABSTRACT

An apparatus and process for allocating carriers in a multi-carrier system is described. In one embodiment, the process comprises determining a location (E, D, C, B, A; FIG. 6) of a subscriber (520) with respect to a base station (510), selecting carriers from a band of carriers to allocate to the subscriber (520) according to the location of the subscriber with respect to the base station (510), and allocating selected carriers to the subscriber (520).

29 Claims, 14 Drawing Sheets

U.S. PATENT DOCUMENTS

| | | | |
|---|---|---|---|
| 6,226,320 B1 | 5/2001 | Hakkinen et al. | |
| 6,366,195 B1* | 4/2002 | Harel et al. | 340/7.21 |
| 6,477,158 B1 | 11/2002 | Take | |
| 6,529,488 B1* | 3/2003 | Urs et al. | 370/330 |
| 6,584,330 B1* | 6/2003 | Ruuska | 455/574 |
| 6,611,506 B1 | 8/2003 | Huang et al. | |
| 6,751,444 B1* | 6/2004 | Meiyappan | 455/69 |
| 6,850,506 B1* | 2/2005 | Holtzman et al. | 370/335 |

FOREIGN PATENT DOCUMENTS

| | | |
|---|---|---|
| EP | 0 926 912 | 6/1999 |
| EP | 0 929 202 | 7/1999 |
| EP | 0 946 070 | 9/1999 |
| EP | 1 094 644 | 4/2001 |
| EP | 1185019 | 3/2002 |
| EP | 0 869 647 | 7/2002 |
| FR | 2 777 407 | 10/1999 |
| GB | 2 209 858 | 5/1989 |
| JP | 06-029922 | 2/1994 |
| JP | 08-256103 | 10/1996 |
| JP | 11-308195 | 5/1999 |
| JP | 2002-232936 | 8/2002 |
| WO | WO-92/00590 A1 | 1/1992 |
| WO | WO 98/15153 | 4/1998 |
| WO | WO 98/16077 | 4/1998 |
| WO | WO 98/30047 | 7/1998 |
| WO | WO 02/49305 | 6/2002 |

OTHER PUBLICATIONS

Wong, C.Y., et al., Multiuser OFDM with Adaptive Subcarrier, Bit, and Power Allocation, IEEE Journal on Selected Areas in Communications, Oct. 1999, IEEE Inc., New York, USA, vol. 17, Nr. 10, pp. 1747-1758.

Gruenheid, R., et al.: "Adaptive Modulation and Multiple Access for the OFDM Transmission Technique", Wireless Personal Communications, Kluwer Academic Publishers, NL, vol. 13, NR.1/2, Year 2000, pp. 5-13.

Motegi, M., et al.: "Optimum Band Allocation According to Subband Condition for BST-OFDM" $11^{th}$ IEEE International Symposium on Personal Indoor and Mobile Radio Communications, vol. 2, Sep. 18-21, 2000, pp. 1236-1240.

Kerpez, Kenneth J. "The channel capacity of hybrid fiber/coax (HFC) networks", Information theory, 1995. Proceedings 1995 IEEE International Symposium on Whistler, BC, Canada Sep. 17-22, 1995, New York, N.Y., USA IEEE US, Sep. 17, 1995, p. 481.

Waldeck, Torsten et al."Telecommunication applications over the low voltage power distribution grid", Spread spectrum techniques and applications, 1998. Proceedings., 1998 IEEE $5^{th}$ International Symposium on Sun City, South Africa Sep. 2-4, 1998, New York, N.Y., USA IEEE US, Sep. 2 1998, vol. 1, pp. 73-77.

English translation of Japanese Office Action issued for Japanese Application No. 2004-551,367; Dated: Mar. 4, 2008; 2 Pages.

Japanese Office Action issued for JP2004-551367, dated Jan. 6, 2009, 3 pages.

Office Action issued for Israeli Patent Application No. 168458, issued on Jun. 23, 2009, and the English language translation, 4 pages.

International Search Report issued for PCT/US02/36030 dated Jun. 26, 2003.

\* cited by examiner

METHOD AND APPARATUS FOR ADAPTIVE CARRIER ALLOCATION AND POWER CONTROL IN MULTI-CARRIER COMMUNICATION SYSTEMS

FIELD OF THE INVENTION

The present invention relates to the field of multi-carrier communication systems; more particularly, the present invention relates to allocating carriers and performing power control in a multi-carrier system.

BACKGROUND OF THE INVENTION

With high-speed wireless services increasingly in demand, there is a need for more throughput per bandwidth to accommodate more subscribers with higher data rates while retaining a guaranteed quality of service (QoS). In point-to-point communications, the achievable data rate between a transmitter and a receiver is constrained by the available bandwidth, propagation channel conditions, as well as the noise-plus-interference levels at the receiver. For wireless networks where a base-station communicates with multiple subscribers, the network capacity also depends on the way the spectral resource is partitioned and the channel conditions and noise-plus-interference levels of all subscribers. In current state-of-the-art, multiple-access protocols, e.g., time-division multiple access (TDMA), frequency-division multiple-access (FDMA), code-division multiple-access (CDMA), are used to distribute the available spectrum among subscribers according to subscribers' data rate requirements. Other critical limiting factors, such as the channel fading conditions, interference levels, and QoS requirements, are ignored in general.

Recently, there is an increasing interest in orthogonal frequency-division multiplexing (OFDM) based frequency division multiple access (OFDMA) wireless networks. One of the biggest advantages of an OFDM modem is the ability to allocate power and rate optimally among narrowband sub-carriers. OFDMA allows for multi-access capability to serve increasing number of subscribers. In OFDMA, one or a cluster OFDM sub-carriers defines a "traffic channel", and different subscribers access to the base-station simultaneously by using different traffic channels.

Existing approaches for wireless traffic channel assignment are subscriber-initiated and single-subscriber (point-to-point) in nature. Since the total throughput of a multiple-access network depends on the channel fading profiles, noise-plus-interference levels, and in the case of spatially separately transceivers, the spatial channel characteristics, of all active subscribers, distributed or subscriber-based channel loading approaches as fundamentally sub-optimum. Furthermore, subscriber-initiated loading algorithms are problematic when multiple transceivers are employed as the base-station, since the signal-to-noise-plus-interference ratio (SINR) measured based on an omni-directional sounding signal does not reveal the actual quality of a particular traffic channel with spatial processing gain. In other words, a "bad" traffic channel measured at the subscriber based on the omni-directional sounding signal may very well be a "good" channel with proper spatial beamforming from the base-station. For these two reasons, innovative information exchange mechanisms and channel assignment and loading protocols that account for the (spatial) channel conditions of all accessing subscribers, as well as their QoS requirements, are highly desirable. Such "spatial-channel-and-QoS-aware" allocation schemes can considerably increase the spectral efficiency and hence data throughput in a given bandwidth. Thus, distributed approaches, i.e., subscriber-initiated assignment are thus fundamentally sub-optimum.

Linear Modulation Techniques, such as Quadrature phase shift keying (QPSK), Quadrature Amplitude Modulation (QAM) and multi-carrier configurations provide good spectral efficiency, however the modulated RF signal resulting from these methods have a fluctuating envelope. This puts stringent and conflicting requirements on the power amplifier (PA) used for transmitting communications. A fluctuating envelope of the modulating signal requires highly linear power amplification. But in order to achieve higher efficiency and improve uplink budget, power amplifiers have to operate close to compression and deliver maximum possible power. As a result, there is a trade off for power versus amount of nonlinear amplification a system can handle.

Furthermore, non-linearity in the PA generates intermodulation distortion (IMD) products. Most of the IMD products appear as interference to adjacent channels. This power is referred to Adjacent Channel Leakage Power Ratio (ACPR or ACLR) in wireless standards.

The ACPR is important to the FCC and wireless standards because of the co-existence with other users of the spectrum operating in adjacent and alternate channels. In band or channel distortion affects the performance of the licensee's own spectrum, which, in turn, affects the transmitter signal-to-noise ratio (SNR) of other users in the same system.

RF link budget in a wireless communication system refers to balancing the available transmit power, antenna gain, propagation loss and determining maximum allowable distance at which received power meets a minimum detectable signal threshold. Several parameters influence the RF link budget. Two main factors, transmitter RF power available from the PA and receiver sensitivity, are under circuit designer's control. Base station design has relatively more degree of freedom than the Customer Equipment (CE). This results in the RF link budget being imbalanced in the uplink: This limitation is hard to overcome given the cost, size and battery life requirements of CE.

SUMMARY OF THE INVENTION

An apparatus and process for allocating carriers in a multi-carrier system is described. In one embodiment, the process comprises determining a location of a subscriber with respect to a base station, selecting carriers from a band of multiple carriers to allocate to the subscriber according to the location of the subscriber with respect to the base station, allocating selected carriers to the subscriber, and indicating to the subscriber whether or not to adjust transmit power above its normal transmit power range.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
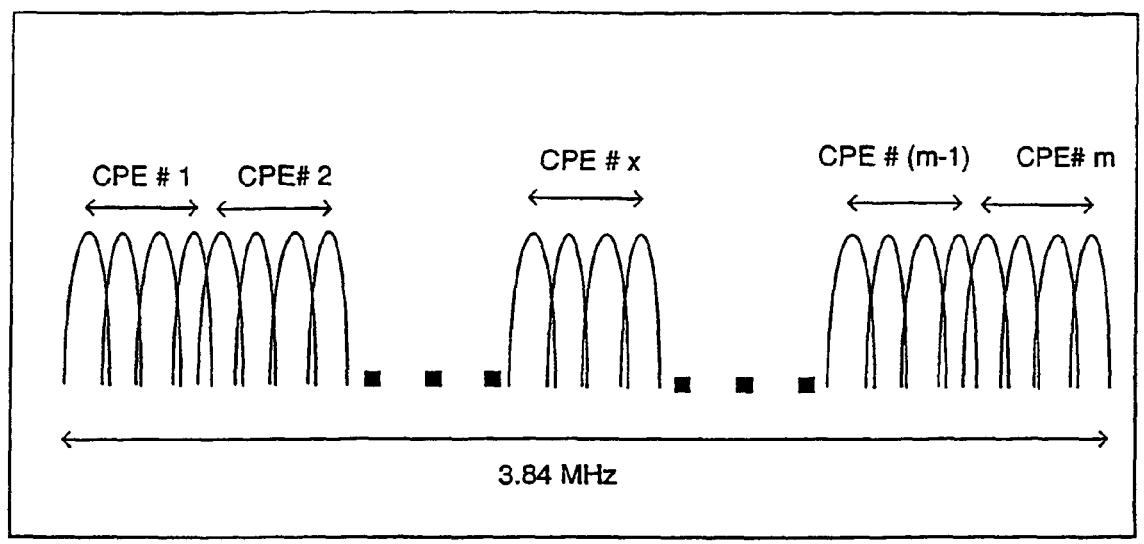
FIG. 1A illustrates a multi-carrier system.

A carrier allocation technique for use in multi-carrier systems is described. The carrier allocation technique selects carriers, or subcarriers, of a band to allocate to a subscriber or Customer Equipment (CE) for their use. In one embodiment, the allocation is performed such that carriers closer to or at the center of the band are allocated to subscriber units and CEs further away from a base station and carriers closer to the edge of the band are allocated to those CEs and subscriber units closer to the base station.

In one embodiment, the technique described herein increases the transmitter radio frequency (RF) power available from a power amplifier (PA) of the CPE, CE, terminal, subscriber unit, portable device, or mobile by exploiting the multi-carrier nature of multiple carrier systems, such as, for example, an orthogonal frequency-division multiple access (OFDM) system. This technique may double or even quadruple the PA output power, resulting in balancing RF link design in a two-way communication system. In one embodiment, this technique may be employed to control a PA device to operate at a higher power and simultaneously meet the Adjacent Channel Leakage Power (ACPR) emission requirements associated with a standard (to which the system is adhering). This may occur when a subscriber unit's power control drives up the transmit power when farther away from the base station after being allocated carriers at or near the center of the band being allocated. Thus, the technique described herein allows the transmit power to be driven up or down based on the position of the subscriber. In one embodiment, the selective carrier method described herein results in 3 to 6 dB increased power, which can considerably improve RF link budget.

Such a method of allocation can be used in a wireless system employing fixed, portable, mobile subscribers or a mixture of these types of subscribers. Note that the term "subscriber," "customer equipment" and "subscriber unit" will be used interchangeably.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Selective Carrier Allocation

The selective carrier allocation technique disclosed is applicable to multi-carrier systems. Example of these include Orthogonal Frequency Division Multiple Access (OFDMA), multi-carrier CDMA, etc. As an example, the selective carrier allocation will be described below with reference to an OFDM system.

In an OFDM system, OFDMA is used for uplink communications to share the spectrum with co-users of the same sector. In other words, the subscriber or CE uses only a portion of the available carriers (or multi-tones) for any given transmission. The base station allocates these carriers to subscribers in a methodical way to avoid interfering, to the extent possibly, with other users in the same sector. The decision to select a set of carriers can be based on several criteria such as, for example, but not limited to, fading, signal-to-noise ratio (SNR) and interference.

Figure 1B:
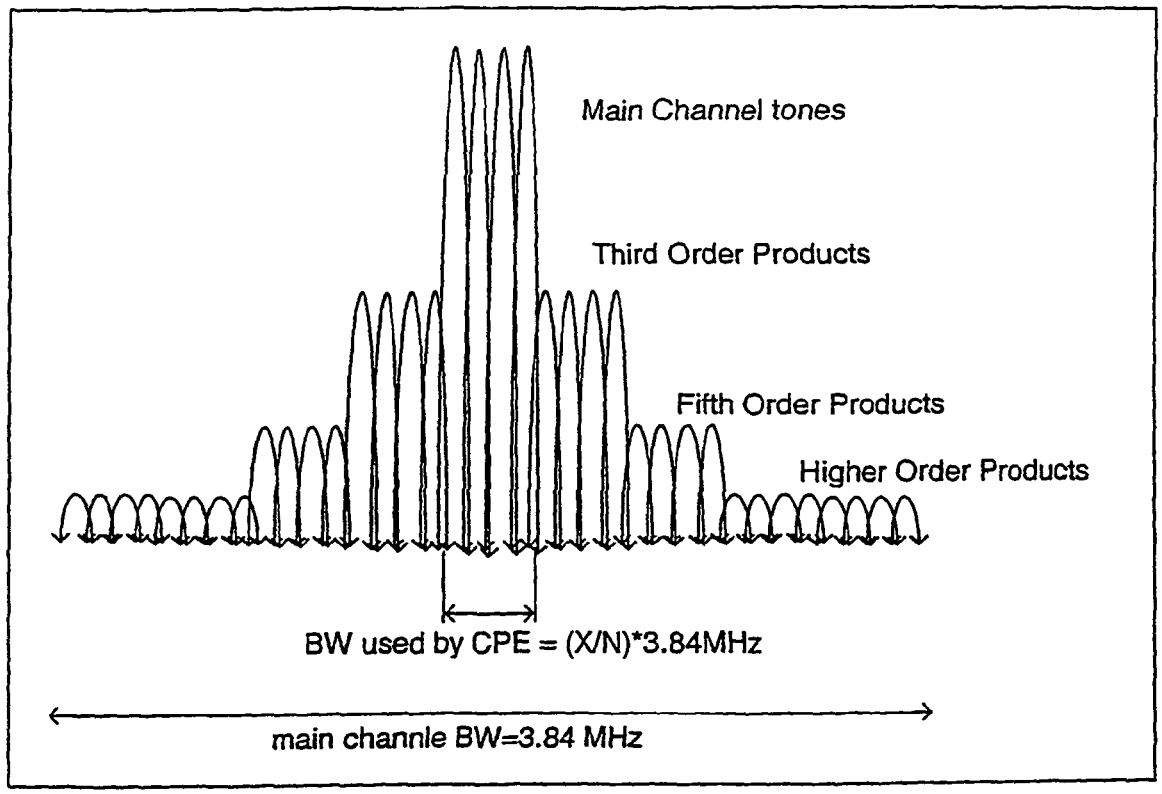
FIG. 1B illustrates spectral re-growth in a multi-carrier system.

FIG. 1A illustrates the spectrum of one embodiment of a multi-carrier system such as OFDM. In such a system, there are a number of modulated carriers (n) occupying a certain bandwidth. For a 3GPP system, this bandwidth is 3.84 MHZ. Non-linearities within the PA mixes or modulates these tones with each other to generate intermodulation distortion (IMD) products. A dominant element of these IMDs is due to third order (2f×f) and fifth order (3f×2f) mixing. The IMD generated by a wide band multiple tone signal causes the spectrum to spread energy (or spill) beyond the allocated 3.84 MHz bandwidth. This is commonly referred as spectral re-growth. FIG. 1B depicts the spectral re-growth phenomena.

Spectral re-growth due to third order mixing falls in the upper and lower adjacent channels, whereas the fifth order mixing product falls on the upper and lower alternate channels. Other higher order products are usually weaker and can be ignored for most practical applications.

As mentioned above, non-linearities in the PA are rich in third order products and are of most concern. These products are seen in the adjacent channels as ACLR power. The fifth and higher order products are spread out further from the main channel and their effect is not a determinant factor.

In a multi-carrier wireless system using 'N' tones, the subscriber unit or CE uses only a limited number of tones, such as 'X' tones where X is a much smaller number compared to N. A CE or subscriber unit using a cluster of X tones will occupy (X/N) of the total channel bandwidth. As depicted in FIG. 1B, spectral re-growth due to third and fifth order products is stronger and is very important. These determine the adjacent and alternate channel coupled powers.

Figure 1C:
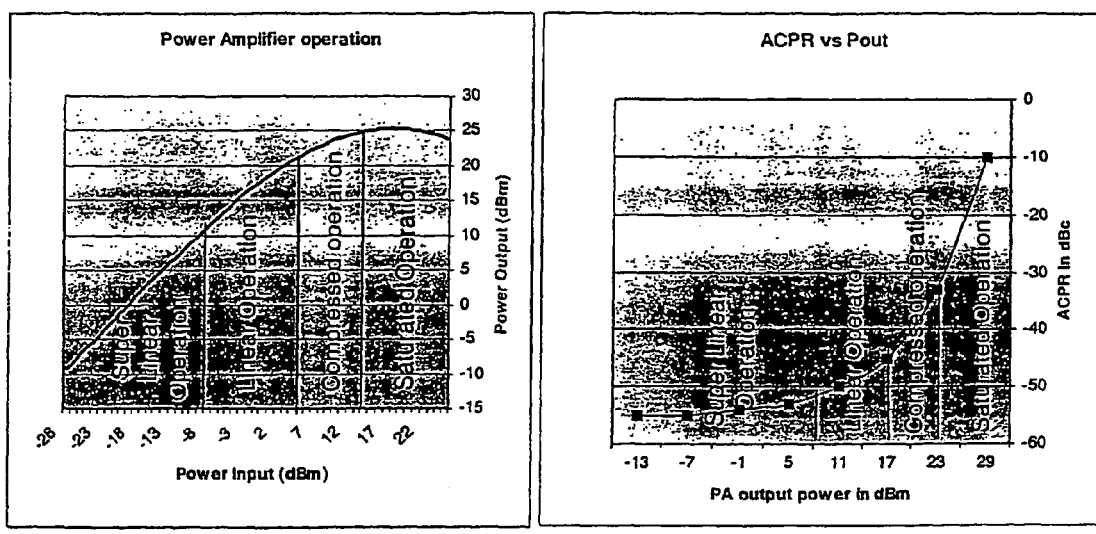
FIG. 1C illustrates power amplifier operating regions.

If clusters around the center of the allocated channel are chosen for transmission, then it is possible for the main IMD products to fall within the channel bandwidth. As a consequence, these carriers can withstand higher level of nonlinear amplification and can be used to transmit at increased power levels compared to other carriers. The CEs/subscriber units closer to the base station operate at lower power than the CEs/subscriber units farther away. FIG. 1C depicts the linear operation and IMD products generated as a function of operating power.

CEs/subscriber units farther away from the base encounter larger path loss and they need to operate at a higher power. Operating at higher power produces a higher level of IMD products and causes spectral growth. These CEs/subscriber units can be allocated the clusters around the center of the operating channel, thereby reducing, and potentially minimizing, the spill over to adjacent channels while simultaneously achieving higher transmit power.

Figure 2:
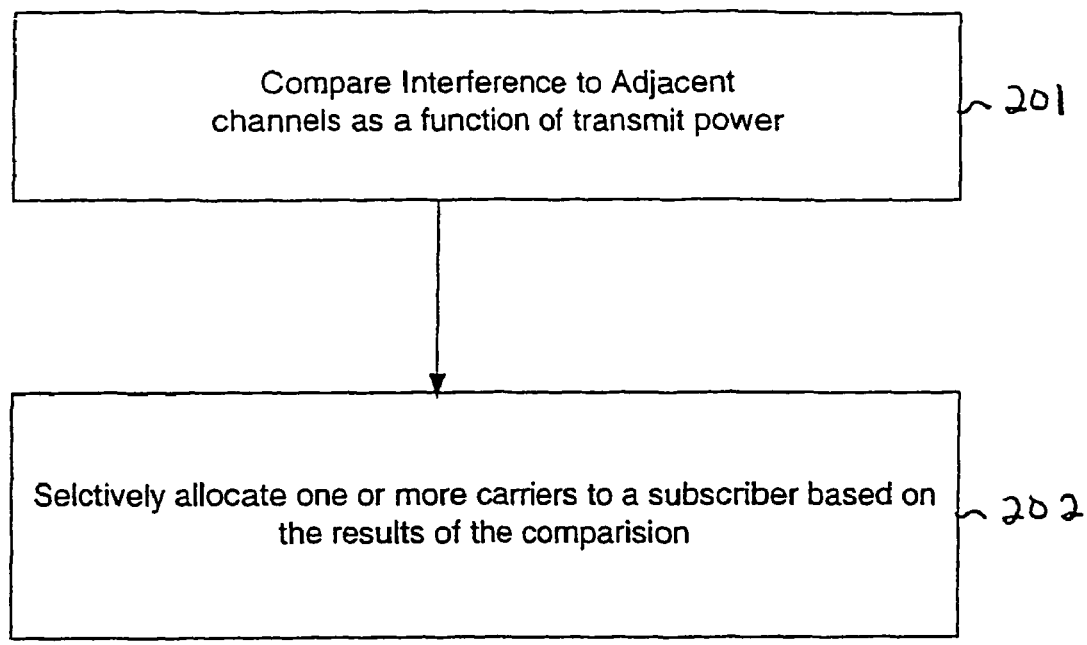
FIG. 2 is a flow diagram of one embodiment of a process for allocating carriers in a multi-carrier system.

FIG. 2 illustrates one embodiment of a process for allocating carriers in a multi-carrier system. The process is performed by processing logic that may comprise hardware (e.g., circuitry, dedicated logic, etc.), software (such as is run on a general purpose computer system or a dedicated machine), or a combination of both.

Referring to FIG. 2, the process begins with processing logic of a base station comparing interference to adjacent channels (e.g., adjacent channel leakage power) with the output power of a subscriber unit in a multi-carrier system as a function of distance of the subscriber unit from the base station (processing block 201). Then the processing logic of the base station selectively allocates one or more carriers to the subscriber unit based on results of the comparison (processing block 202). In one embodiment, one or more subscribers closer to the base station are allocated carriers closer to the band edges of the operating channel and one or more subscribers farther from the base station are allocated carriers around the center of the operating channel. Referring to FIG. 1B, the CE occupies main channel bandwidth of $[(X/N)*3.84]$ Mhz for uplink transmission. Third order IMD products generated by this channel will occupy $[(X/N)*3.84]$ Mhz on the upper and lower sides of the main channel. Similarly, fifth order IMD products will occupy another $[(X/N)*3.84]$ Mhz on either side of the third order products. Thus, twice the main channel bandwidth on each side of the main channel will be occupied by significant components of IMD. Therefore, the clusters falling within $\{½[3.84-(4*\text{main channel bandwidth})]\}$ from the center of the band can benefit due to this carrier allocation method.

As a result of this allocation, dominant undesired spectral re-growths can be restricted to lie within the wireless system's occupied channel and avoid interference to adjacent channels. Furthermore, the PA of a subscriber unit can be operated closer to 1 dB compression point and deliver higher power than the conventional usage. Operation near compression point also improves the PA efficiency.

In one embodiment, the carriers being allocated are orthogonal frequency-division multiple access (OFDMA) carriers. The OFDMA carriers may be allocated in clusters. In another embodiment, each carrier may be a spreading code and the multi-carrier system comprises a multi-carrier code-division multiple-access (MC-CDMA) system.

In one embodiment, the multi-carrier system is a wireless communication system. Alternatively, the multi-carrier system is a cable system.

Figure 3:
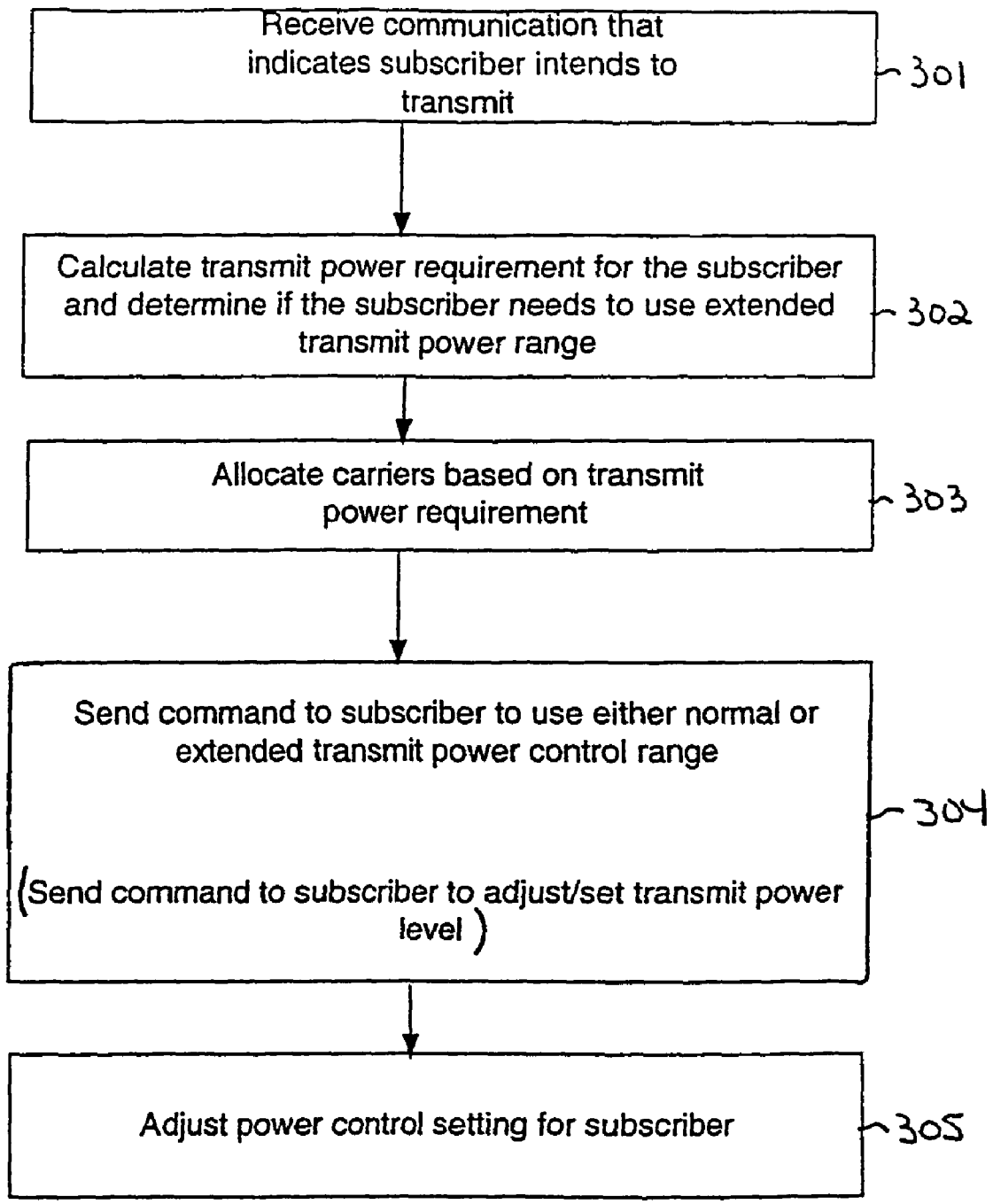
FIG. 3 is a flow diagram of one embodiment of a process for a base station to allocate carriers in a multi-carrier system.

FIG. 3 illustrates one embodiment of a process performed by a base station for allocating carriers of a band in a multi-carrier system. The process is performed by processing logic that may comprise hardware (e.g., circuitry, dedicated logic, etc.), software (such as is run on a general purpose computer system or a dedicated machine), or a combination of both.

Referring to FIG. 3, the process begins with processing logic receiving a communication indicating that a subscriber intends to transmit (processing block 301). In one embodiment, the communication is a random access intention to transmit sent by the subscriber and is received by a base.

In response to receiving the communication, processing logic of the base calculates the transmit power requirements for the subscriber unit and determines whether the subscriber is near or far (processing block 302). In one embodiment, the processing logic calculates the time delay and path loss associated with the subscriber and uses this information to calculate the transmit power requirements. Note that transmit power is based on the path loss, and the time delay provides additional information on the distance of the customer equipment. In one embodiment, processing logic uses additional factors such as, for example, SINR, in calculating the transmit power requirements Based on the transmit power requirements calculated and the determination of whether the subscriber unit is near or far, processing logic allocates carriers to the subscriber (processing block 303). In one embodiment, each carrier is identified by a tone number or a group of carriers are identified by a cluster number in a multi-carrier system. The base instructs the customer equipment to use a particular set of carriers identified by their number. In one embodiment, the processing logic in the base station allocates carriers near the center of the band (it is to allocate) to subscriber units far away from the base station and carriers near the edges of the band to subscriber units closer to the base station. The processing logic may attempt to allocate more carriers closer the edges of band in order to save carriers for currently non-present subscriber units that will enter the coverage area of the base station in the future or present subscriber units that will move from a location close to the base station to one farther away from the base station.

In one embodiment, in order to allocate carriers to subscribers, processing logic in the base station assigns a priority code to each subscriber unit based on the location of the subscriber unit in relation to the base station (e.g., whether the subscriber unit is far away from or near to the base station). A priority code is assigned based on the transmit power requirement, which, in turn, is based on the path loss. The location of the CE determines the path loss. In general, the farther away the CE from the base, the path loss is more, but not always. For example, there could be a nearby CE (to the base) but behind a tall building or hill, causing an RF shadow. In such a case, this CE will have large path loss. In one embodiment, the subscriber farthest from the base station is allocated priority code #1, followed by the next farthest subscriber with priority code #2, and so on.

Processing logic in the base station may also send a command to a subscriber unit to cause the subscriber unit to use either a normal or extended power control range of "z dB" above the normal range depending on priority and carrier allocation (processing block 304). In other words, the base station sends commands to the subscriber to indicate whether to raise or lower its transmit power. This is closed loop power control to tune the transmit power of the subscriber.

In one embodiment, processing logic in the base station also adjusts power control setting for the subscriber in a closed loop power control setting and continuously monitors received power from subscribers (processing block 305). For example, if the channel characteristics change, the path loss changes and the base has to update the transmit power of the CE.

Figure 4:
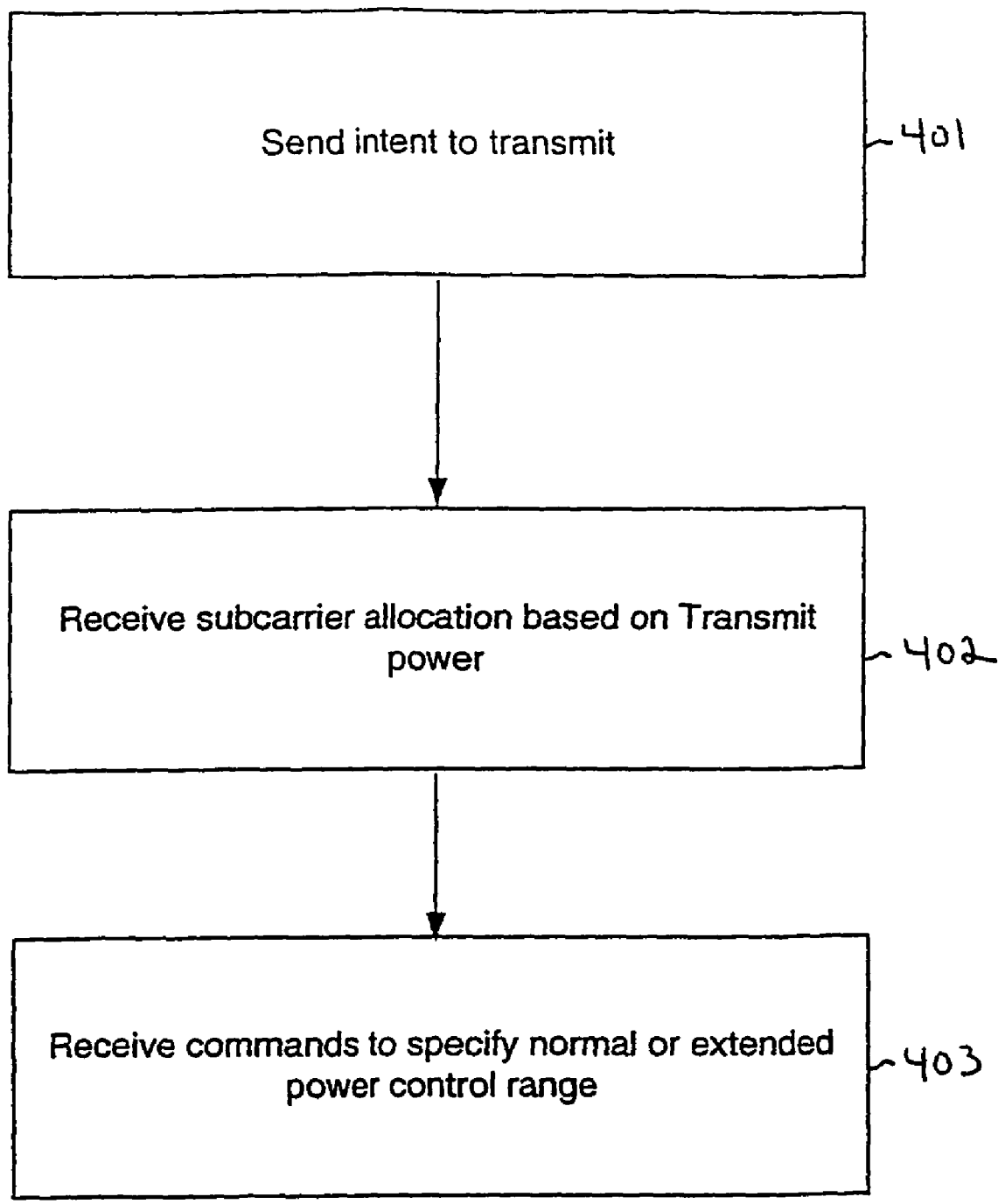
FIG. 4 is a flow diagram of one embodiment of a process by which a subscriber unit is allocated carriers in a multi-carrier system.

FIG. 4 illustrates one embodiment of a process performed by a subscriber unit in a multi-carrier system. The process is performed by processing logic that may comprise hardware (e.g., circuitry, dedicated logic, etc.), software (such as is run on a general purpose computer system or a dedicated machine), or a combination of both.

Referring to FIG. 4, processing logic in the subscriber unit sends a communication to a base station to indicate that it intends to transmit (processing block 401). In one embodiment, the processing logic sends a random access intention to transmit.

Processing logic in the subscriber unit receives an indication of an allocation of carriers based on the location of the subscriber unit with respect to a base station (processing block 402). In one embodiment, the indication comes from the base station on the control channel.

In one embodiment, processing logic in the subscriber unit also receives a command from the base station to use either a normal or extended power control range (processing block 403). In one embodiment, whether the base station indicates to the subscriber unit to use the normal or extended power control range is based on assigned priority and carrier allocation. These command indicate to the subscriber unit that it is to drive up or reduce its transmit power, and whether it is one or the other depends on the position of the subscriber relative to the base station.

Figure 5:
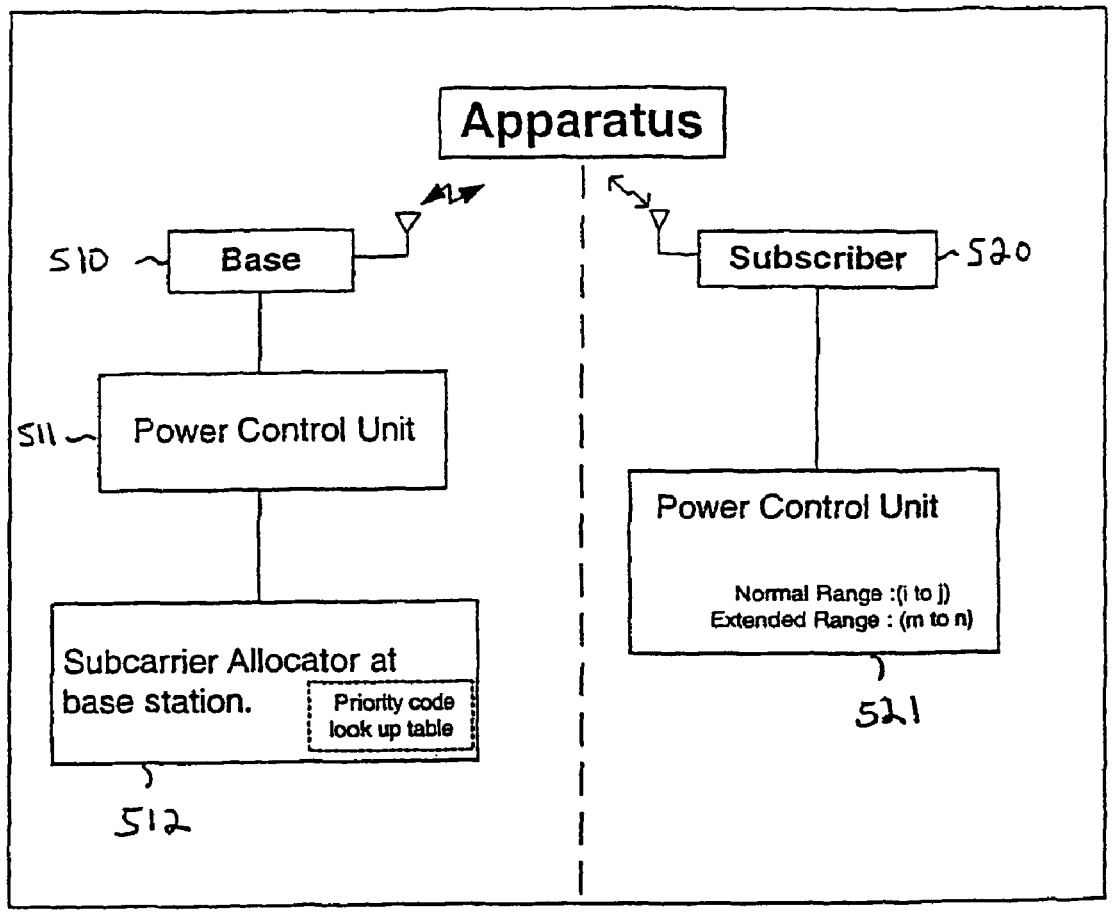
FIG. 5 illustrates an exemplary system having a base station and a subscriber unit.

FIG. 5 is a block diagram of one embodiment of a typical system. Referring to FIG. 5, a base 510 is shown communicably coupled to a subscriber unit 520. Base station 510 includes a power control unit 511 coupled to a carrier allocator 512. Carrier allocator 512 allocates carriers of a band to subscriber units, such as subscriber unit 520, in the system, and power control unit 511. In one embodiment, carrier allocator 512 includes a priority code look up table (LUT) 513. At a given instant, the farthest subscriber(s) may not be active in the system. Therefore, the embodiment described here uses predetermined threshold limits in the LUT to determine the carrier allocation and power control.

In one embodiment, carrier allocator 512 decides the spectral priority based on the information gathered from the access requests sent by subscriber units. Carrier allocator 512 assigns priorities to each subscriber based on location with respect to base station 510 and then allocates carriers to each subscriber. Carrier allocator 512 allocates carriers at or near the center of the band to the subscribers farthest away from base station and allocates carriers closer to or at the edge of the band to subscribers closest to base station 510. In one embodiment, carrier allocator 512 attempts to allocate sub-carriers at the edges of the band to the nearest subscribers and make room for potential subscribers located farther way from base station 510.

In one embodiment, carrier allocator 512 classifies subscribers into priority groups rather than assigning them individual priorities. In a cell-based system, carrier allocator 512 identifies subscribers near the center of the sector form one group and have a certain priority code. If constant path loss contours are imagined, subscribers falling between certain path losses or between these contours form a group and are assigned a certain priority.

Carrier allocator 512 also continuously monitors the allocation of the carriers used by various subscribers in the system and dynamically reallocates the carriers to subscribers. For example, in a mobile system, both the mobile unit(s) and base station continuously monitor the path loss and may perform reallocation and adaptive power control to extend the range. If the subscriber has moved closer to the base station, then carrier allocator 512 changes the priority codes and deallocates the sub-carriers near the center for other potential subscribers. Similarly, when a subscriber moves away from base station 510, then carrier allocator changes the priority codes and allocates the sub-carriers near the center of the band depending on availability.

The priority determined by sub-carrier allocator 512 is communicated to subscriber unit 520 by power control unit 511. In one embodiment, sub-carrier allocator 512 transmits information about the specific carriers available for the subscriber, the priority code on these carriers, and the power control range (normal or extended). This communication indicates to the subscribers to use a certain power control range based on their priority and carrier allocation. Power control unit 511 indicates to subscriber unit 520 the transmit power level it is to use. In one embodiment, power control unit 511 indicates to subscriber unit 520 to extend power control range if subscriber unit 520 is allocated carriers at center of the spectrum. That is, power control unit 511 sends out power control commands to the subscribers in order for the received power at base station 510 to be at the desired level. Thus, power control unit 511 is responsible for closed loop power control.

Subscriber unit 520 includes a power control unit 521. Power control unit 521 controls the transmit power of subscriber unit 520. That is, power control unit 521 adjusts the transmit power from subscriber unit 520 to keep the received power at base station 510 at a predetermined level desired by base station 510. Thus, power control unit 521 is responsible for closed loop power control.

In one embodiment, power control unit 521 processes power control commands received from the base station and determines the allocated power control range for subscriber unit 520. In one embodiment, power control unit 521 includes a normal power control range (i to j) and an extended power control range (m to n) and power control unit 521 tells subscriber unit 520 to extend the power control range if the subscriber is allocated sub-carriers at the center of the spectrum. In one embodiment, the power control unit signals the gain control circuit of the transmitter of the subscriber unit to extend the power control range. In one embodiment, subscriber unit 520 is responsive to a code received from the base station which indicates the power control range to use. Subscriber unit 520 may include a look up table (LUT) that stores power control ranges and/or transmit powers associated with each code received from the base station, and uses the code as an index into the LUT to determine what power control range and/or transmit power is being requested.

The system maintains its ACLR, however by allocating carriers near or at the center of the band, the subscriber gets an increase of power (e.g., 3-6 db). That is, in a system with subscribers typically transmitting at 17 dbm with a 3 kilometer range, a subscriber allocated carriers at the cneter may be able to transmit 18 or 19 dbm, thereby allowing it to extend its range potentially to 4 km.

Figure 11:
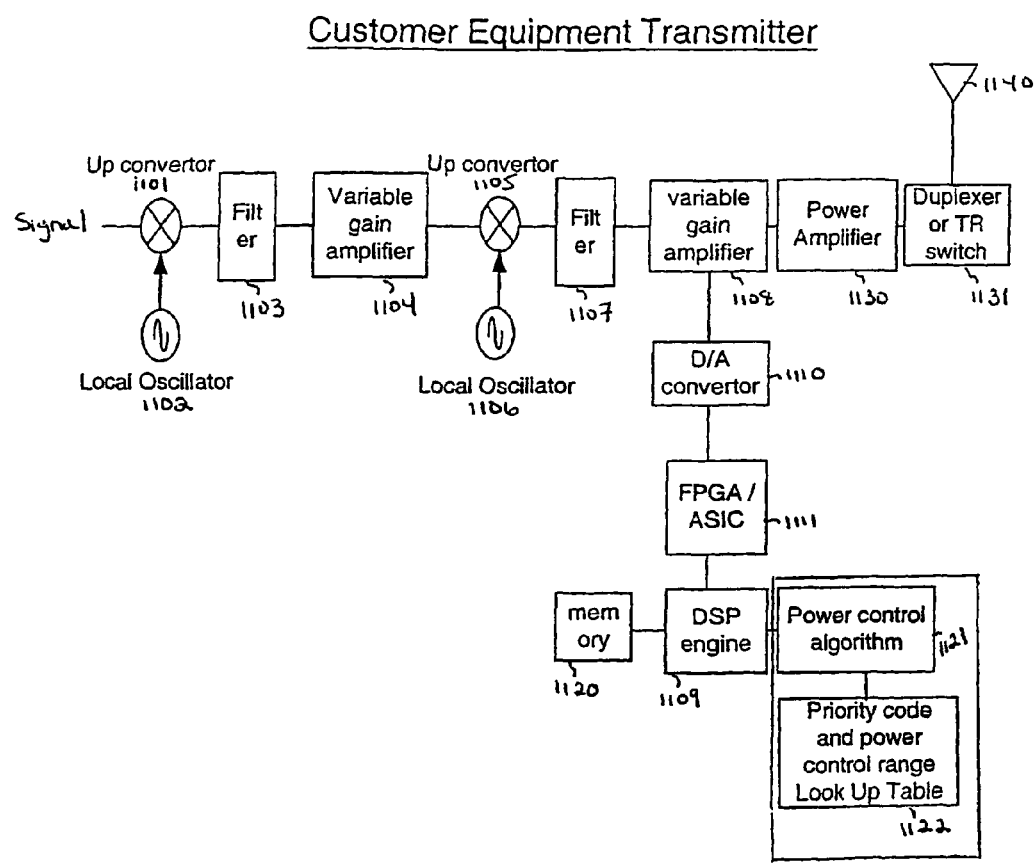
FIG. 11 is a block diagram of one embodiment of a customer equipment transmitter.

FIG. 11 is a block diagram of one embodiment of a customer equipment transmitter. Referring to FIG. 11, an upconverter 1101 mixes a signal to be transmitted with a signal from a local oscillator 1102 to create an upconverted signal. The upconverted signal is filtered by filter 1103. The filtered signal output from filter 1103 are input to a variable gain amplifier 1104, which amplifies the filtered signal. The amplified signal output from variable gain amplifier 1104 is mixed with a signal from a local oscillator 1106 using upconverter 1105. The upconverted signal output from upconverter 1105 is filtered by filter 1107 and input to variable gain amplifier 1108.

Variable gain amplifier 1108 amplifies the signal output from filter 1107 based on a control signal. Variable gain amplifier 1108 and the control signal is controlled by DSP engine 1109 which executes a power control algorithm 1121 with the use of priority code and power control range look-up table (LUT) 1122. Both the power control algorithm 1121 and priority code and power control range LUT 1122 are stored in external memory. In addition, memory 1120 is also coupled to DSP engine 1109. In one embodiment, when power is turned off power control algorithm 1121 and LUT 1122 are stored in external memory 1120. DSP engine 1109 is also coupled to external memory 1120 so that it can download code to the internal memory of DSP engine 1109. The output of DSP engine 1109 is control signal that is input to FPGA/ASIC 1111, which buffers the output data from DSP engine 1109 and formats it so that the data is readable by digital-to-analog (D/A) converter 1110. The output of ASIC 1111 is coupled to an input of D/A converter 1110 which converts the control signal from digital-to-analog. The analog signal is input to variable gain amplifier 1108 to control the gain that is applied to output of filter 1107.

The amplified signal output from output variable gain amplifier 1108 is input to a power amplifier 1130. The output of power amplifier 1130 is coupled to a duplexer or transmit switch 1131. The output duplexer/TR switch 1131 is coupled to antenna 1140 for transmission therefrom.

Figure 12:
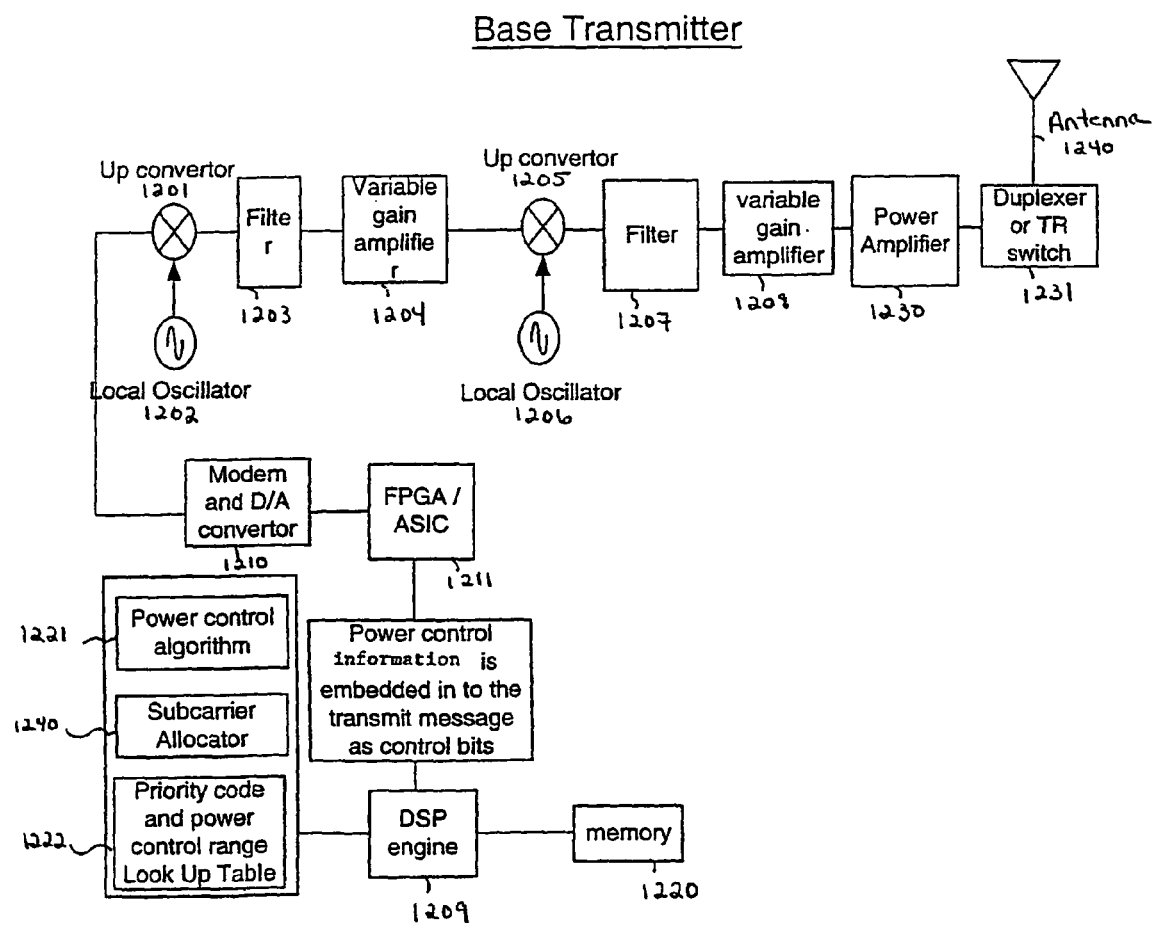
FIG. 12 is a block diagram of one embodiment of a base transmitter.

FIG. 12 is a block diagram of one embodiment of a base transmitter. Referring to FIG. 12, DSP engine 1209 performs power control and subcarrier allocation using power control algorithm 1221 in conjunction with a priority code and power control range look-up table 1222 (stored in memory), and subcarrier allocator 1240, respectively. In addition, memory 1220 is also coupled to DSP engine 1209. The output of DSP engine 1209 is power control information that is embedded into a transmit message as control bits. The transmit message is input to FPGA/ASIC 1211, which buffers the output data from DSP engine 1209 and formats it so that the data is readable by D/A converter 1210. The output of ASIC 1211 is input to modem and D/A converter 1210 which modulates the signal and converts the signal from digital to analog. The analog signal is input to upconverter 1201.

Upconverter 1201 mixes the signal from converter 1210 with a signal from a local oscillator 1202 to create an upconverted signal. The upconverted signal is filtered to filter 1203. The filter signals output to a variable gain amplifier 1204 which amplifies the signal. The amplified signal is output from variable gain amplifier 1204 and mix with a signal from a local oscillator 1206 using upconverter 1205. The upconverted signal output from upconverter 1205 is filtered by filter 1207.

Variable gain amplifier 1208 amplifies the signal output from filter 1207. The amplified signal output from variable gain amplifier 1208 is input to a power amplifier 1230. The output of power amplifier 1230 is coupled to a duplexer or transmit switch 1231. The output duplexer/TR switch 1231 is coupled to antenna 1240 for transmission therefrom.

An Exemplary System

Figure 6:
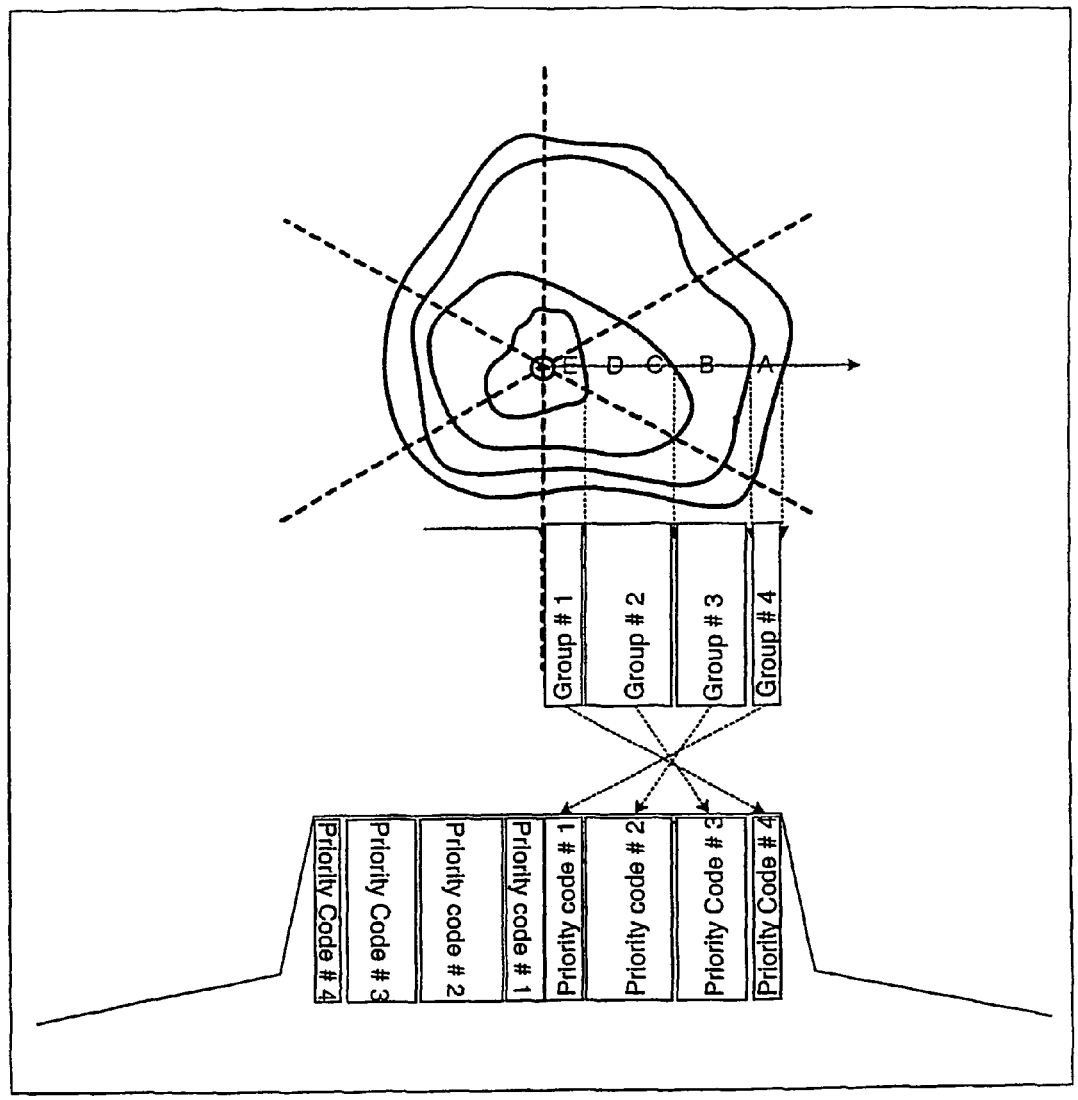
FIG. 6 illustrates a system having a base station and multiple subscribers grouping based on constant path loss contours.

FIG. 6 illustrates an exemplary system having a base station, with its coverage area, and multiple subscribers. The coverage range of the base station is divided into distance groups 1 to 4. Although not limited as such, there are 5 subscribers A, B, C, D and E sending random access intention to transmit. These subscribers are located physically as depicted in FIG. 6.

The spectrum has been divided into sub groups numbered 1, 2, 3 and 4. Grouping is based on path loss in this case. Table 1 summarizes the group attributes and transmit power requirements of each subscriber unit.

TABLE 1

Grouping and Power Control table

| Group number | Path loss in dB | Terminal Transmit power in dBm | Spectral Priority Code | Spectrum Allocation | | Power Control Range |
|---|---|---|---|---|---|---|
| 1 | >−100 | <−13 | 4 | Center +3 | Normal | −40 dBm to +17 dBm |
| 2 | −101 to −115 | −12 to +2 | 3 | Center +2 | Normal | −40 dBm to +17 dBm |
| 3 | −116 to −130 | +3 to +17 | 2 | Center +1 | Normal | −40 dBm to +17 dBm |
| 4 | −131 to −136 | +18 to +23 | 1 | Center | Extended | −40 dBm to +23 dBm |

The allocation process to allocate carriers to subscriber A is as follows. First, subscriber A sends a random access intention to transmit to the base station. Second, the base station receives the request and calculates time delay and path loss for subscriber A. Next, based on results of the calculation of the time delay and the path loss for subscriber A and Table 1, the base station determines that subscriber A belongs to distance group-4. The base station also determines that subscriber A needs to transmit with spectral priority code-1. Then the base station commands to use an extended power control range and allocates carriers in the center of the spectrum. Thereafter, the base station and subscriber A adjust power control settings in a closed loop power control mode and continuously monitor. In the case of the base station, the base station continuously monitors the signals received from subscribers (and calculates the time delay and path loss).

It should be noted that subscribers may or may not be allocated carriers that are closer to the edge or to the center of the band in comparison to a subscriber that is adjacent to them. For example, in the case of FIG. 6, in one allocation, subscriber E could be allocated carriers closest to the edges of a band, followed by carriers allocated to subscriber D being the next closest, followed by carriers allocated to subscriber C, and so on, until subscriber A, which would be allocated carriers closest to the center of the band (in comparison to subscribers B-E). However, during other allocations, one or more subscribers may be allocated carriers closer to the edge of the band or closer to the center of the band than carriers allocated to a subscriber who is closer to or further from the base station, respectively. For example, in FIG. 6, it is possible that subscriber D is allocated carriers closer to the edge of the band than those allocated to subscriber E.

Comparison with a Prior Art System

Figure 7:
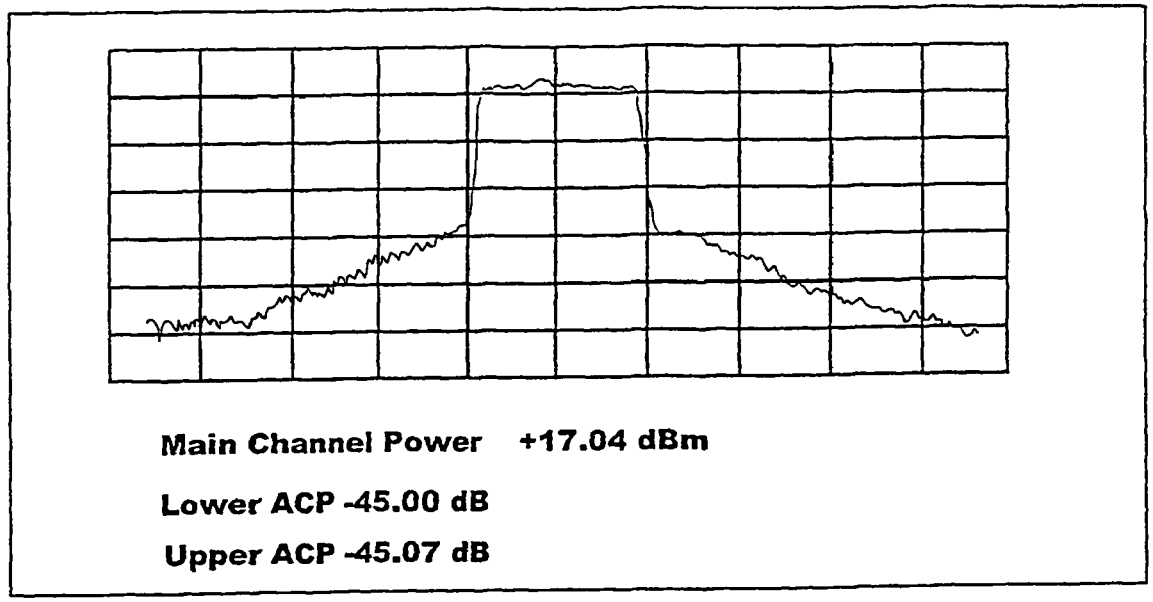
FIG. 7 illustrates an exemplary WCDMA modulation terminal power output for a 45 dBc ACLR.
Figure 8:
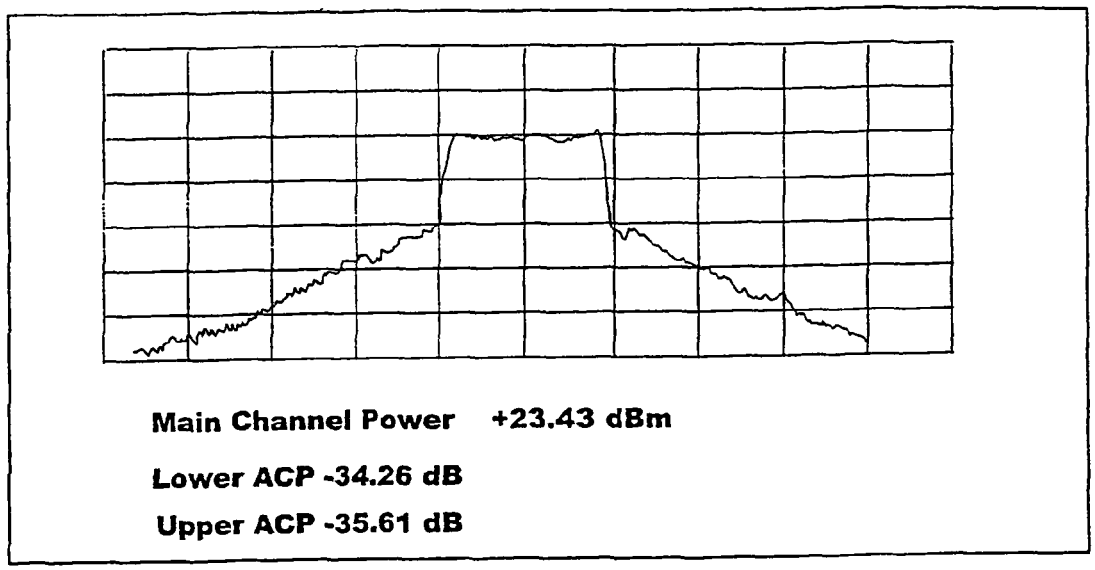
FIG. 8 illustrates an exemplary WCDMA modulation terminal power output for a 33 dBc ACLR as defined by the 3GPP standard.

FIG. 7 is a spectral plot for ACLR of 45 dBc for a system having a hardware platform designed for a 1800 MHZ TDD wireless communication system. The 45 dBc amount is selected because if a system is designed to coexist with ANSI-95, ACLR of 45 dBc has to be met, and ACLR for a PCS CDMA system is defined in ANSI-95 to be 45 dBc in a RBW of 30 KHz. In order to meet the ACLR of 45 dB, the output power capability of the terminal is about +17 dbM.

Figure 9:
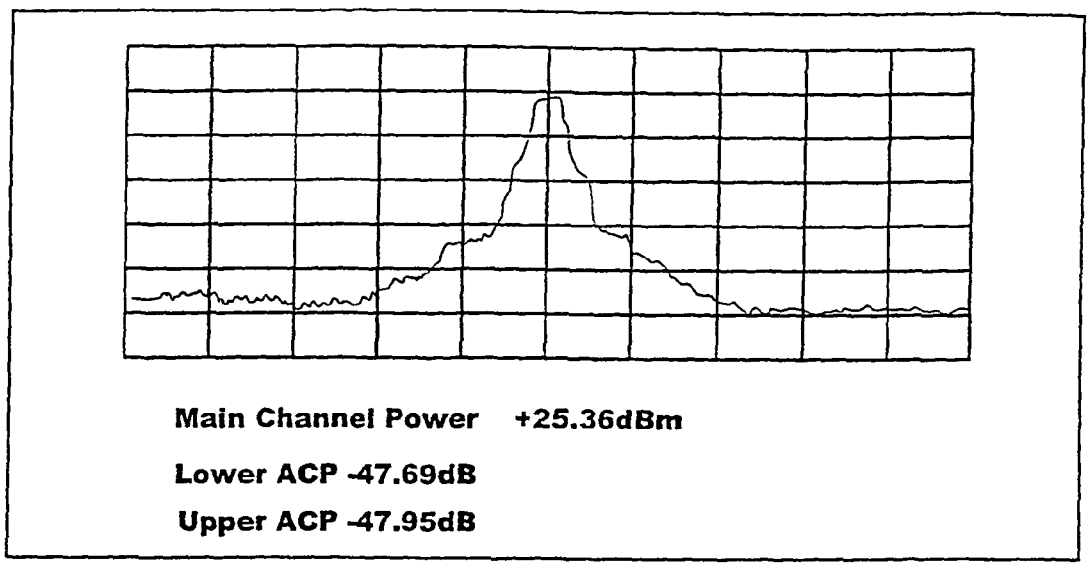
FIG. 9 illustrates an OFDM selective tone modulation terminal power output.

FIG. 9 shows the capability of terminal operating with the use of the carrier allocation described herein is +23 dBm for ACLR of 33 dBc. One of the evolving standards, 3GPP, defines the ACLR to be 33 dBc for CEs.

Note that operating the PA of a subscriber closer to compression for more power results in in-band distortion. However, employing the methodology of the present invention does not degrade the system performance. This fact may be shown through the use of an example as given below.

Power control algorithms ensure that power received at the base station from all CEs or subscribers arrive at the same level. This means that the signal peak to average ratio received at the base is near zero. It is assumed in this example that a cluster of carriers is allocated at the center of the channel to the farthest user and this user meets the transmit signal quality and SNR requirements for the base receiver to demodulate. If the minimum detectable signal at the receiver is −92 dBm for an SNR of 10 dB, then the receive noise floor is set at −102 dBm. If the farthest CE operates at a TX SNR of 12 dB or better and power control algorithm sets the system such that this signal from the CE arrives at −92 dBm to the base, then the IMD products generated by this CE are buried in the RX noise floor. All the other channels see only the receive noise floor. The receiver thermal noise floor is inherent to all communication system. Hence, the overall performance of the system has not been degraded.

In order to increase, and potentially maximize, the output power available to the farthest terminal, a cluster at the center of the channel can be allocated. This way the IMD products and spectral re-growth generated by the farthest user does not cause spill over to the adjacent channel.

FIG. 9 shows that the terminal is capable of transmitting at output power level of +25 dBm while maintaining ACLR of 45 dBc. This is an improvement of nearly 8 dB compared to situation described above in FIG. 7. As mentioned above, the PA efficiency is better when it operates closer to its saturated power. Thus, it improves the battery life at no cost to hardware implementation. Resulting inter modulation products for the in band channel are measured to be 14 dB. This distortion product power level is lower than the receiver SNR requirement of 12 dB requirement for the up link in other systems.

Figure 10:
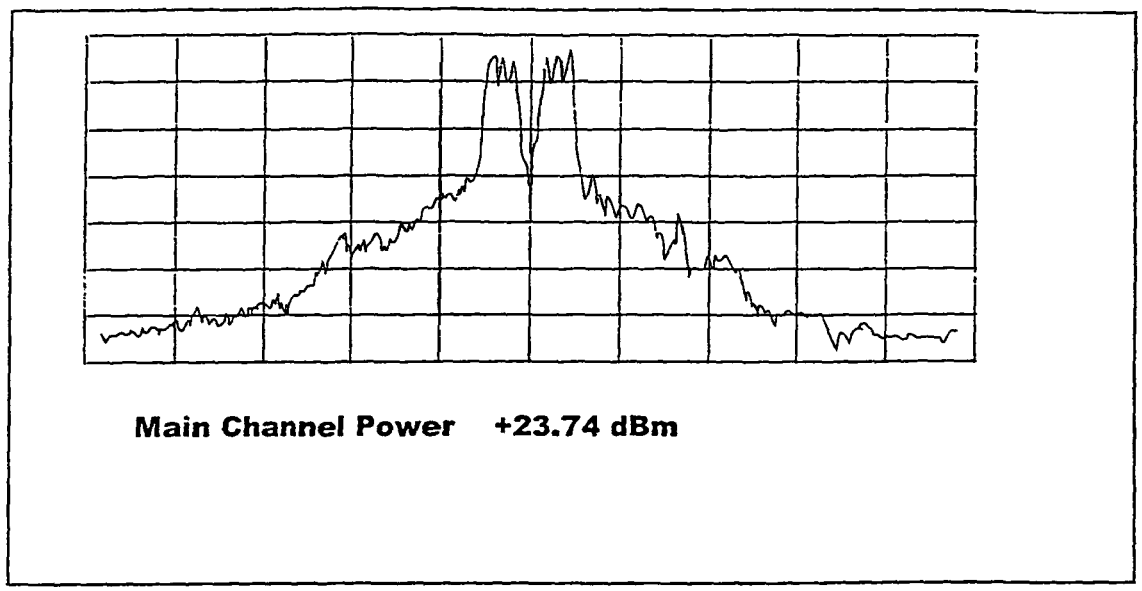
FIG. 10 illustrates NPR due to operating a Customer Equipment (CE) at an increased power level.

In band Noise Power Ratio (NPR) typically characterizes distortion for multi-carrier system. FIG. 10 is a measurement of NPR when the CE is operated at a power level of +23 dBm. NPR is about 22 dB, thereby indicating the distortion levels will be buried well below the thermal noise floor of the base station receiver.

Table 2 below summarizes the performance improvements achieved by the selective carrier allocation method described herein.

TABLE 2

Performance Comparison

| Channel Power (dBm) | NPR (dB) | ACPR conventional way | ACPR - Selective carrier allocation method |
|---|---|---|---|
| 14 | 32 | >45 | >45 |
| 17 | 32 | 45 | >45 |
| 20 | 28 | 39 | >45 |
| 23 | 22 | 33 | >45 |
| 24 | 18 | — | >45 |
| 25 | 12 | — | >45 |
| 26 | 9 | — | 45 |

CONCLUSION

A carrier allocation method and apparatus are described which potentially maximizes the subscriber unit or customer equipment CE transmitter power. In one embodiments improvements from 3 dB to 6 dB can be achieved using the methodology described herein to allocate OFDM tones to subscriber units or CEs.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A process for allocating carriers in a multicarrier system, the process comprising:
    determining a location of a subscriber with respect to a base station;
    selecting carriers from a band of multi-carriers to allocate to the subscriber according to the location of the subscriber with respect to the base station;
    allocating selected carriers to the subscriber,
    indicating to the subscriber whether or not to adjust transmit power to above its normal transmit power range based, at least in part, on the selected carriers allocated to the subscriber;
    adjusting a power control setting for the subscriber at the base station; and
    assigning a spectral priority code to the subscriber based on whether the subscriber is near or far from the base station, wherein the spectral priority code assigned to a subscriber far from the base station is higher in priority than the spectral priority code assigned to a subscriber near the base station, and wherein carrier allocation occurs based on the spectral priority code.

2. The process defined in claim 1 wherein the closer the subscriber is to the base station the farther away the selected carriers are from the center of the band.

3. The process defined in claim 1 wherein selecting carriers from the band of multi-carriers comprises:
    selecting carriers closer to or at the center of the band when the subscriber is far away from the base station; and
    selecting carriers farther away from the center of the band when the subscriber is close to the base station.

4. The process defined in claim 1 further comprising:
    receiving a request from a subscriber; calculating a time delay and a path loss associated with the subscriber; and
    determining transmit power requirements for the subscriber based on the time delay and the path loss.

5. The process defined in claim 4 wherein determining transmit power requirements is further based on signal-to-noise-plus-interference ratio.

6. The process defined in claim 1 further comprising sending a command to the subscriber to use either a normal or extended power control range based on carrier allocation.

7. The process defined in claim 6 further comprising adjusting a power control setting for the subscriber at the base station.

8. The process defined by claim 7 further comprising:
    assigning a spectral priority code to the subscriber based on whether the subscriber is near to or far from the base station, and wherein carrier allocation occurs based on the spectral priority code.

9. The process defined in claim 8 further comprising allocating carriers at the center of the band to the subscriber when the subscriber is assigned a first predetermined spectral priority code.

10. The process defined in claim 9 further comprising allocating carriers adjacent to carriers at the center of the band to the subscriber when the subscriber is assigned a second predetermined spectral priority code that is of a lower priority than the first predetermined spectral priority code.

11. An apparatus comprising:
    a carrier allocator to determine spectral priority based on information gathered from access requests sent by subscriber units; and
    a power control unit coupled to the carrier allocator to indicate a power control range for each of the subscriber units, wherein said power control range is based, at least in part, on said determined spectral priority.

12. The apparatus defined in claim 11 wherein the carrier allocator allocates carriers at edges of a band to the nearest subscribers.

13. The apparatus defined in claim 11 wherein the carrier allocator classifies subscribers into priority groups and allocates carriers to each of the subscribers based on the priority group in which each of the subscribers resides.

14. The apparatus defined in claim 11 wherein the carrier allocator monitors allocation of the carriers and dynamically reallocates carriers to subscribers.

15. The apparatus defined in claim 14 wherein the carrier allocator reallocates carriers closer to the center of the band when a subscriber moves farther away from the base station.

16. The apparatus defined in claim 14 wherein the carrier allocator reallocates carriers farther from the center of the band when a subscriber moves closer to the base station.

17. The apparatus defined in claim 11 wherein the power control units commands at least one of the subscriber units to extend the power control range of the subscriber.

18. A method comprising:
    a subscriber sending an indication to transmit;
    the subscriber receiving an indication of carriers selected based on distance of the subscriber from a base station in relation to other subscribers, wherein the carriers are for use in communicating with the base station; and
    the subscriber receiving a command from the base station to use either a normal or extended power control range based, at least on, the location of the subscriber in relation to the base station and the carriers allocated to the subscriber.

19. The method defined in claim 18 further comprising driving up or down subscriber transmit power depending on a location of the subscriber in relation to a base station.

20. The method defined in claim 19 further comprising:
    receiving a power control command from the base station, and wherein the subscriber drives up or down the subscriber transmit power based on the location of the subscriber in relation to the base station.

21. The method defined in claim 18 further comprising:
    receiving a command to use either a normal or extended power control range based on the carriers allocated; and
    transmitting at a higher power while simultaneously meeting Federal Communications Commission (FCC) Adjacent Channel Leakage Power Ratio (ACPR) standard.

22. A method for communicating between a base station and subscribers comprising:
    comparing interference caused by an operating channel to adjacent channels with output power of one or more subscribers wherein the interference comprises leakage power;
    selectively allocating one or more carriers of a band to the one or more subscribers in the multi-carrier system based on results of the comparison of the leakage power to adjacent channels and the output power, wherein one or more subscribers closer to the base station are allocated carriers closer to the band edges of the operating channel and one or more subscribers further from the base station are allocated carriers near or at the center of the band of the operating channel;

sending an indication to the one or more subscribers to use an extended power control range if the allocated carriers are at or near the center of the band of the operating channel.

23. The method defined in claim 22 wherein the adjacent channel leakage power is the Federal Communications Commission (FCC) Adjacent Channel Leakage Power Ratio (ACPR) standard.

24. The method defined in claim 22 wherein the carriers being allocated comprise orthogonal frequency-division multiple access (OFDMA) carriers.

25. The method defined in claim 22 wherein each carrier being allocated comprise a cluster of orthogonal frequency-division multiple access (OFDMA) carriers.

26. The method defined in claim 22 wherein at least one of the one or more carriers comprises a spreading code and the multi-carrier system comprises a code-division multiple-access (CDMA) system.

27. The method defined in claim 22 wherein at least one of the one or more carriers comprises an antenna beam in a space-division multiple access (SDMA) system.

28. The method defined in claim 22 wherein the multi-carrier system comprises a wireless system.

29. The method defined in claim 22 wherein the multi-carrier system comprises a cable system.

* * * * *